Patented Mar. 31, 1953

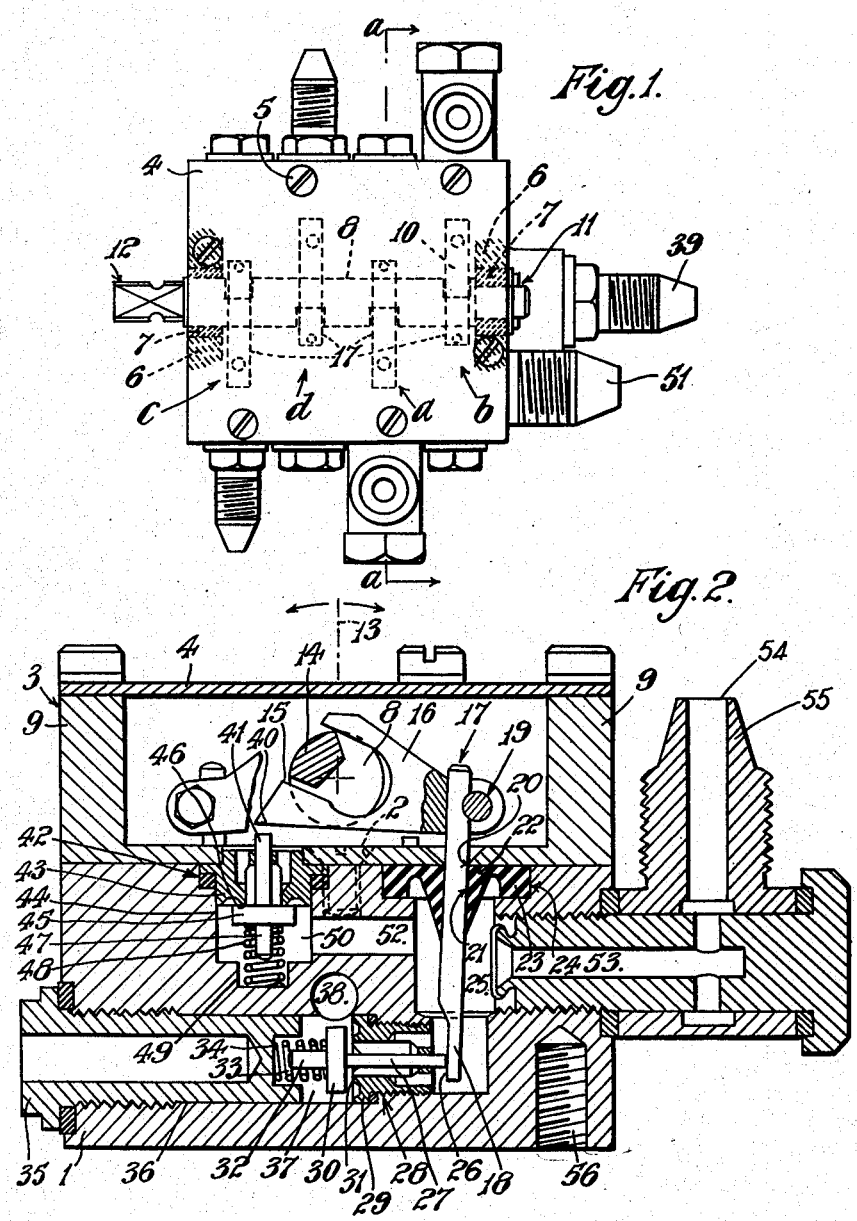

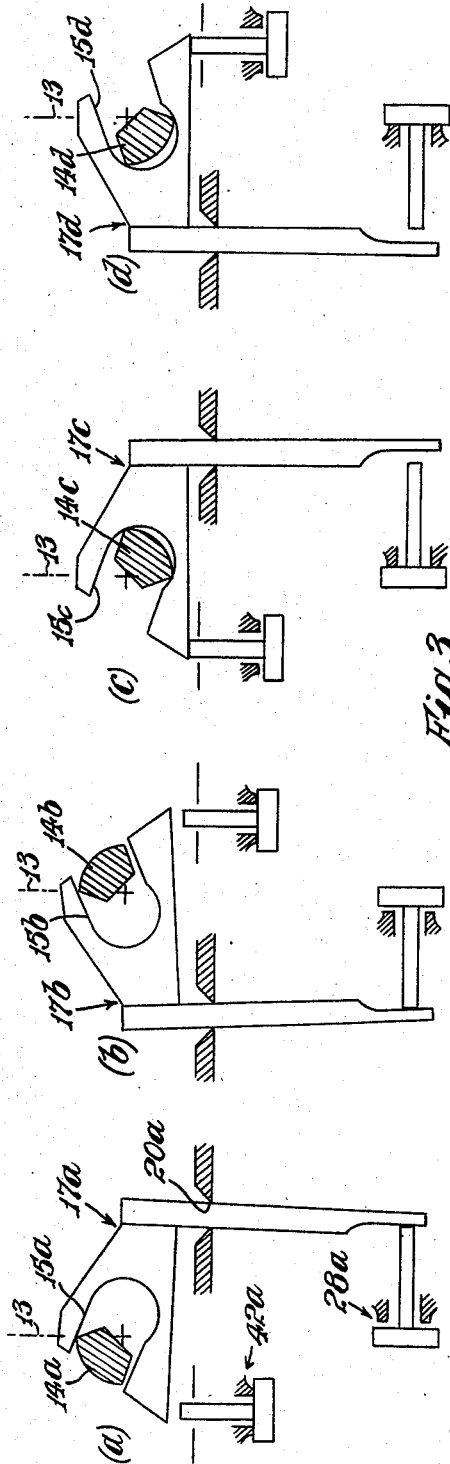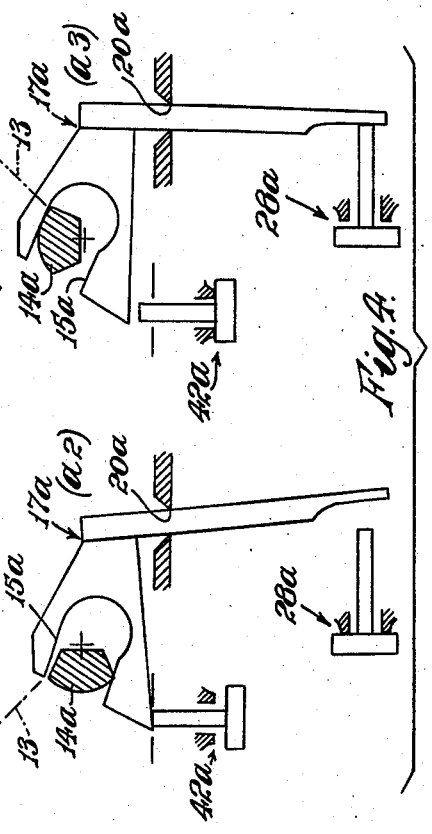

2,633,152

UNITED STATES PATENT OFFICE 2,633,152

FLUID PRESSURE VALVE

Henry Trevaskis, Solihull, England, assignor to Dunlop Rubber Company Limited, London, England, a British company Application February 7, 1947, Serial No. 727,239
In Great Britain February 19, 1946

11 Claims. (Cl. 137—622)

My invention relates to fluid pressure valves of the type for controlling the movement of mechanism, apparatus or the like disposed remote from said pressure valve, and, more particularly, for controlling the movement of aircraft under-carriages, flaps or the like either pneumatically or hydraulically. Such pressure valves may be employed selectively to operate two or more of the mechanism simultaneously.

Fluid pressure valves of the above type should be capable of admitting fluid pressure to the mechanism that operates the undercarriages or the like of aircraft, of ensuring that the fluid pressure is maintained therein as long as may be required, and of permitting the fluid pressure to escape when desired. Each pressure valve therefore has virtually two chambers, one chamber in communication with the source of fluid supply, and the second of these chambers in communication with the mechanism that operates the undercarriages or the like. There must then be an inlet valve to permit the fluid pressure to pass from the first to the second chamber and an exhaust valve to permit the fluid pressure to pass from the second chamber to the atmosphere when it is no longer required. Both valves should not of course be open at the same time.

The inlet and exhaust valves may be of the sliding or the direct-acting types. Sliding members have the disadvantages that they are only maintained in a fluid-tight condition with difficulty and must be lubricated in order to be maintained in good operative condition. When the valves are of the direct-acting type, the exhaust valve can readily be operated externally of the valve housing but the means for operating the inlet valve must pass into the pressure chamber and the difficulties of making a leak-proof joint are again encountered. Fluid pressure valves hitherto have therefore been of a complicated nature thereby rendering them heavy and cumbersome and also liable to fluid leakage so that their efficient working can be seriously impaired when exposed to a wide range of temperature variations such as for example are normally encountered in varying flying conditions.

It is an object of the invention to provide a simple direct-acting leak-proof valve capable of working satisfactorily within wide temperature changes, say between 55° and 70° C. It is a further object of the invention to provide a selector valve light in weight and of small bulk.

According to the invention there is provided a fluid pressure valve of the type described and having a housing for spring-loaded inlet and exhaust valves wherein the operative means for the said valves is an L-shaped member of which one arm is adapted to operate the exhaust valve external of the said housing and the other arm is adapted to pass through an aperture in the housing and to operate the inlet valve within the said housing, the said member being pivotally connected to the housing at the aperture for the inlet valve arm.

Further according to the invention the said L-shaped member is adapted to be actuated by a circular shaft, the said shaft having a substantially sector-shaped cross-section at a location in its length, and the exhaust valve arm of the said member having a slot to receive the shaft at the said location.

It should be appreciated that the invention is not limited to fluid pressure valves having only one system of inlet and exhaust valves and therefore also according to the invention the housing has a chamber in communication with a source of fluid pressure and two independent control systems of spring-loaded inlet and exhaust valves in side-by-side relationship, the slotted arm of each L-shaped member of each adjoining system being disposed preferably on opposite sides of the shaft.

Still further according to the invention the housing has a chamber in communication with a source of fluid pressure and four independent control systems of spring-loaded inlet and exhaust valves in side-by-side relationship, the slotted arm of the L-shaped member of each adjoining system being disposed preferably on opposite sides of the shaft.

In order that the invention may be clearly understood and carried into effect the same will now be more particularly described with reference to the accompanying drawings in which—

Fig. 1 is a plan view of a fluid pressure valve suitable for the selective control of a double-acting jack which has three effective lengths of stroke.

Fig. 2 is a sectional side view of Fig. 1 on the lines $a$—$a$ and on an enlarged scale.

Fig. 3 shows diagrammatic representations at $a$, $b$, $c$, and $d$ of the four L-shaped members and associated parts in one position of the shaft.

Fig. 4 shows diagrammatic representations at $a2$ and $a3$ of the L-shaped member shown in Fig. 3 ($a$) but in its other positions.

Referring to Figs. 1 and 2 the pressure valve has a base or housing 1 onto whose upper face is rigidly secured, by a plurality of screws 2, a box 3 which has its top closed by a plate 4 fixed by screws 5. Opposed vertical side walls 6 of said box are provided with axially aligned bearing bushes 7 in which is revolubly mounted a horizontally disposed circular shaft 8 positioned centrally of side walls 9 of the box. The shaft is prevented from axial movement by a shoulder 10 and retaining means 11 at its one end, its other end being squared as at 12 for reception of a suitable operating lever (not shown) whose axis is shown in chain lines at 13. The lever is indicated as being in its mid-position and is normally swingable to positions substantially at 45° each side of said indicated position for purposes to be hereinafter described.

At four equispaced locations a, b, c, and d, the location a being shown in Fig. 2 and now described as representative of all said locations and associated parts, the shaft is cut away to a substantially sector-shaped cross-section 14 which operates within a slot 15 formed in one horizontally disposed arm 16 of an L-shaped member 17 having a depending arm 18 provided by a circular rod secured at its upper end to arm 16 by nut and bolt means 19. The depending arm 18, intermediate its ends, passes through a chamfered aperture 20 which forms a fulcrum, and is surrounded and bonded in a fluid-tight manner at 21 to a bush 22 of resilient material such as rubber and having a flange 23 located fluid-tight in a seating 24 in the upper face of the housing 1 and secured by the abutting lower face of the box 3. The lower end of the depending arm 18 is movably disposed within a central chamber 25 in the housing, and is formed with a flat face 26 adapted to operate on the end of a valve stem 27 of a horizontally disposed direct-acting inlet valve 28. The stem 27 is slidably supported in a valve body 29 mounted fluid-tight around its periphery in the housing 1, said stem having a head 30 which co-operates with a seating 31 on the body 29. A spigot 32, co-axial with the stem 27, and on the opposite side of the head 30 is adapted to locate a compression spring 33 whose other end is housed within a blind hole 34 in a plug 35 which is screwed into a bore 36 in the housing 1 in a fluid-tight manner. The plug 35 also facilitates assembly of the inlet valve 28 in the housing 1. A chamber 37 is thus formed by the body 29, plug 35 and bore 36 and said chamber is in direct communication with a fluid-pressure supply duct 38 formed in the housing 1 and parallel with and directly below the shaft 8, said duct being closed at its one end (not shown) and in communication with an inlet union 39 mounted on the housing 1.

The arm 16 at its underside end 40, co-operates with the end of a valve stem 41 of a vertically disposed direct-acting exhaust valve 42, there being a comparatively large clearance between the parts 40 and 41 in the position shown and for a purpose to be hereinafter described. The stem 41 is slidably supported in a valve body 43 located in a bore 44 of the housing in a fluid-tight manner and is maintained so by the lower face of the box 3. The valve stem 41 is integrally formed with a head 45 which co-operates with a seating 46 on the body 43, and a spigot 47 projects from a side of the head 45 opposite the stem 41 and serves as a mounting for one end of a compression spring 48 whose other end is located in a blind hole 49. A chamber 50 is therefore formed in the bore 44 and is adapted to communicate through the valve 42 with the box 3 and exhaust union 51 mounted thereon, and by a passage 52 with the chamber 25 from which leads a passageway 53 to a port 54 in a pipe union 55 secured fluid-tight in the housing 1 and adapted to be connected to the jack or other mechanism on the aircraft.

For suitably securing the pressure valve a plurality of tapped holes 56 (only one of which is shown) are provided in the base of the housing 1.

The L-shaped member 17 corresponding to location a is clearly shown as being disposed mainly on the right-hand side of the shaft 8 as is also the L-shaped member corresponding to location c, while the L-shaped members corresponding to the locations b and d, are disposed mainly on the left-hand side of the shaft, and it should be understood that the various valves, passages and chambers are arranged to suit their respective L-shaped members.

Referring to the four diagrammatic representations shown in Fig. 3, the operating handle is indicated at 13 in its mid-position and the sector-shaped cross-sections 14a, 14b work in the open ends of their respective slots 15a, 15b while the sector-shaped cross-sections 14c, 14d work in the closed ends of their respective slots 15c, 15d said sector-shaped cross-sections 14a, 14c being diametrically opposite, the said sector-shaped cross-sections 14b, 14d also being diametrically opposite. The representations illustrate that only the two systems controlled from the locations a and b have their respective inlet valves opened.

Referring now to Fig. 4, representation a2 illustrates the movement occurring when the operating lever is rotated through approximately 45° in an anti-clockwise direction whereby the L-shaped member 17a is rocked about its fulcrum 20a to close the inlet valve 28a and open the exhaust valve 42a, said exhaust valve being opened after the inlet valve has closed by reason of the large clearance between parts 40, 41 hereinbefore referred to.

Each slot 15 is so positioned relative to each respective sector-shaped cross-section 14 that, as just described, rotation of the sector-shaped cross-section in one direction from its mid-position opens the closed valve and closes the open valve whereas rotation of the sector-shaped cross-section in the other direction, as shown in representation a3, when said lever is rotated in a clockwise direction through approximately 45°, the L-shaped member is not substantially moved and therefore the inlet and exhaust valve positions are maintained as when the operating lever is in its mid-position.

While only the three positions of the inlet and exhaust valves associated with location a are illustrated, it should be understood that the inlet and exhaust valves associated with locations b, c, and d have made related movements such that for each of the three positions of the operating handle, two systems have their respective inlet valves opened while the other two systems have their exhaust valves opened. The actual position of the inlet valves for each position of the operating handle are shown in the following table, it of course being understood that when the inlet valve is open, the exhaust valve is shut and vice-versa.

| Movement of operating handle | Anti-clockwise | Mid-pos'n | Clockwise |
|---|---|---|---|
| Inlet valve a | Shut | Open | Open. |
| Inlet valve b | Open | do | Shut. |
| Inlet valve c | do | Shut | Do. |
| Inlet valve d | Shut | do | Open. |

Such a fluid-pressure valve is suitable, for example, for the operation of a jack of the double-acting type having two co-axially opposed cylinders and pistons. The valve is connected to the jack with the valves *a* and *c* leading to one cylinder and on opposite sides of the piston slidable therein, and valves *b* and *d* leading to the other cylinder on opposite sides of its associated piston, so that, reading from one end of the jack, the connections to the valves are lettered consecutively "*a*," "*c*," "*b*," "*d*." In accordance with the table given above, an anti-clockwise movement of the operating handle will fully extend the jack, a clockwise movement of the operating handle will fully contract the jack and when the handle is in the mid-position the jack is partially extended.

Having described my invention, what I claim is:

1. Apparatus for controlling pressure fluids which comprises a valve housing having an inlet port, an outlet, and an exhaust port and having a pivot opening in one wall, a spring loaded valve closing said inlet port and having an operating stem in said housing, a spring loaded exhaust valve closing said exhaust port and having an operating stem extending outside of said housing, said stems being in transverse positions relative to each other, an operating member which comprises a rod extending through said pivot opening of said housing to a position opposed to the stem of said inlet valve and an arm extending sidewise from said rod to a position opposed to the stem of said exhaust valve, a flexible bushing sealed fluid-tight about said rod and to said wall about said pivot opening to seal said rod in said housing and permit it to pivot in said pivot opening, said arm having a slot at its free end, a shaft extending transversely through said slot and having off center portions to engage said arm and move it in one direction to open said inlet valve and in the opposite direction to open said exhaust valve.

2. Apparatus for controlling pressure fluids which comprises a chamber having an inlet port, an outlet, and an exhaust port, a spring loaded inlet valve to close said inlet port having a stem projecting in said chamber, a spring loaded exhaust valve to close said exhaust port having an operating stem projecting outside said chamber, an opening in said chamber bevelled toward its inner edge, an operating element movable in opposite directions from mid position having an exhaust valve operating arm outside said chamber positioned to engage the stem of said exhaust valve and move said valve to open position when said member is moved in one direction and an inlet valve operating arm extending through and pivoting on the bevelled edge of said opening to engage the stem of said inlet valve and move it to open position when said member is moved in the opposite direction, and a flexible sealing member sealed to said inlet valve operating arm and to said chamber to seal said opening and flexing to permit tilting movement of said operating member in said opening.

3. The apparatus of claim 2 having a rocking element to engage said arm and rock said operating member.

4. The apparatus of claim 2 in which said exhaust valve operating arm has a slot, and a shaft extending through said slot and having off-center portions in said slot to engage and rock said member in opposite directions.

5. Apparatus for controlling pressure fluids which comprises a housing having a number of chambers, each chamber having a bevel edge pivot opening in its wall and having an inlet port and an exhaust port, the inlet and exhaust ports of one chamber being in reverse position to those of another chamber, spring loaded inlet valves, one for the inlet port of each chamber, spring loaded exhaust valves one for the exhaust port of each chamber, said inlet valves having operating stems one within its respective chamber, said exhaust valves each having an operating stem on the outside of its respective chamber, an operating shaft having parts cut away to form sector-shaped cross-sectional areas, one for each chamber, operating members, one for each chamber, each operating member being in reverse relation to another and comprising an inlet valve operating arm extending through said pivot opening into its respective chamber to a position opposite the stem of its respective inlet valve, a flexible gasket sealed to said arm and to said wall about said pivot opening to permit said member to pivot on the bevel edge of said opening, each member having an outlet valve operating arm outside its respective chamber extending sidewise of said inlet valve operating arm to a position opposite the stem of its respective exhaust valve, each said outlet valve operating arm having a slot engaging the sector sections of said shaft positioned to rock said member in one direction or the other to open alternatively said inlet and exhaust valves.

6. Apparatus for controlling fluid under pressure which comprises a chamber having an inlet port, an exhaust port and an outlet and having a flaring pivot opening in its wall, a spring loaded inlet valve in said chamber to close said inlet port, a spring loaded exhaust valve to close said exhaust port, a rockable L-shaped operating member having an inlet valve arm extending fluid-tightly through said pivot opening and pivoting therein to operate the inlet valve and an exhaust valve arm exterior of the chamber to operate the exhaust valve, a slot in the exhaust valve arm, and an actuating shaft extending through said slot having an off-center portion in said slot to engage and rock said operating member as the shaft is rotated, thereby opening one valve and closing the other.

7. The apparatus of claim 6 in which rotation of the shaft in one direction closes the inlet valve and opens the exhaust valve, and rotation of the shaft in the other direction opens the inlet valve and closes the exhaust valve and in which both inlet and exhaust valves are closed in mid position of said shaft.

8. The apparatus of claim 6 wherein said inlet valve arm has bonded thereto a flanged bushing of resilient, flexible material, the flange of which is secured fluid tight to said wall in concentric relation to said aperture to permit said arm to pivot on said wall.

9. Apparatus for controlling fluid under pressure which comprises four pressure chambers in side by side relation, each chamber having an inlet port, and outlet and an exhaust port, a spring-loaded inlet valve to close said inlet port having a stem projecting in said chamber, a spring-loaded exhaust valve to close said exhaust port having an operating stem projecting outside said chamber, an opening in said chamber bevelled towards its inner edge, four rockable L-shaped operating members one for each chamber and movable in opposite directions from mid-position, each having a slotted exhaust valve operating arm outside said chamber positioned to engage the stem of said exhaust valve and move said valve to open position when said member is moved in one direction, and an inlet valve operating arm extending through and pivoting on the bevelled edge of said opening to engage the stem of said inlet valve and move it to open position when said member is moved in the opposite direction, a flexible sealing member sealed to each of said inlet valve operating arms and to its associated chamber to seal said opening and flexing to permit tilting movement of said operating member in said opening and an actuating shaft extending through the slots in each of said exhaust valve operating arms and having an off-centre portion in each of said slots to engage and rock said L-shaped members as the shaft is rotated.

10. The apparatus of claim 9 in which the four sets of spring loaded inlet and exhaust valves are in side by side relationship and the slotted arms of adjacent L-shaped members are disposed on opposite sides of said actuating shaft.

11. The apparatus of claim 9 in which rotation of the shaft in one direction opens the two extreme valves and closes the two intermediate inlet valves and rotation of the shaft in the other direction closes the two extreme inlet valves and opens the two intermediate valves and rotation of the shaft to a mid position closes two adjacent inlet valves and opens the other two adjacent inlet valves.

HENRY TREVASKIS.

REFERENCES CITED

The following references are of record in the file of this patent:

UNITED STATES PATENTS

| Number | Name | Date |
| --- | --- | --- |
| 978,579 | Grebel | Dec. 13, 1910 |
| 1,610,811 | Nordstrom | Dec. 14, 1926 |
| 1,868,520 | Brooks | July 26, 1938 |
| 2,114,900 | Gilchrist | Apr. 19, 1938 |
| 2,317,065 | Kaelin | Apr. 20, 1943 |